(12) United States Patent
Crooks et al.

(10) Patent No.: US 9,977,940 B2
(45) Date of Patent: May 22, 2018

(54) SCANNER WITH HOSTED SERVER INTERFACE

(71) Applicant: NCR Corporation, Duluth, GA (US)

(72) Inventors: John Crooks, Duluth, GA (US); J. Stephen McDaniel, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days. days.

(21) Appl. No.: 15/271,337

(22) Filed: Sep. 21, 2016

(65) Prior Publication Data
US 2018/0082093 A1 Mar. 22, 2018

(51) Int. Cl.
| | |
|---|---|
| *G06K 15/00* | (2006.01) |
| *G06K 7/10* | (2006.01) |
| *H04W 76/00* | (2018.01) |
| *G06Q 20/20* | (2012.01) |
| *H04W 76/02* | (2009.01) |
| *G06K 19/06* | (2006.01) |

(52) U.S. Cl.
CPC ... *G06K 7/10712* (2013.01); *G06K 19/06037* (2013.01); *G06Q 20/20* (2013.01); *H04W 76/002* (2013.01); *H04W 76/02* (2013.01)

(58) Field of Classification Search
USPC .......................................... 235/383
See application file for complete search history.

(56) References Cited

U.S. PATENT DOCUMENTS

| | | | |
|---|---|---|---|
| 8,880,028 B2* | 11/2014 | Han | H04M 1/7253 235/492 |
| 2016/0005020 A1* | 1/2016 | Fernando | G06F 3/048 705/21 |
| 2016/0127600 A1* | 5/2016 | Beatty | H04N 1/327 358/1.15 |

* cited by examiner

*Primary Examiner* — Ahshik Kim
(74) *Attorney, Agent, or Firm* — Schwegman, Lundberg & Woessner; Paul W. Martin

(57) ABSTRACT

A scanner is integrated into a Point-Of-Sale (POS) terminal; the scanner provides scanning information during POS transactions over a POS connection and provides a server interface for connecting and communicating with an external and remote connected device independent of the POS connection.

11 Claims, 4 Drawing Sheets

SCANNER WITH HOSTED SERVER INTERFACE

BACKGROUND

Point-Of-Sale (POS) devices often include a variety of integrated devices, such as scanners, scales, integrated scanners with scales, card readers with on-screen signature capabilities, and the like.

Historically, scanners that are integrated into POS devices are difficult and cumbersome to configure, which results in customer calls to support desks for assistance. Additionally, integrated scanners often require personnel to be physically present at the POS devices when the scanners are configured. Alternatively, scanners require a specific operating system (OS) application module for achieving scanner configuration, which means scanner configuration becomes dependent on the POS device's OS. Updates to the OS can require updates to the OS scanner configuration module, which means a single scanner may need multiple supported OS configuration modules because the scanner can be deployed to multiple POS devices, each having different OSs or different versions of a same OS.

These requirements of being physically present at the POS or maintaining an OS-specific scanner configuration module with the underlying POS OS also make it difficult to keep firmware upgrades to the scanner in synchronization with the scanner and its POS device software that interfaces with the scanner.

In addition, some integrated POS scanners support interfaced handheld or remote scanners connected to the POS scanners. This means that installers and integration support staff can have additional work beyond just updating a scanner's firmware or POS OS-specific scanner configuration module when upgrades or patches are made to a scanner.

Still further, retailers, which deploy the integrated POS scanners in POS devices within their stores, tightly control their infrastructure and networks. Thus, it is not an easy administrative task for scanner installers and support staff to obtain the requisite permissions for temporarily connecting staff-support devices to the POS device or the scanner for performing installation, support, and testing. Also, the retailer's POS device is offline and not available for customer transactions during whatever time is granted to the support staff by the retailer.

SUMMARY

In various embodiments, methods and a scanner are provided for operating a scanner with a hosted server interface.

According to an embodiment, a method for operating a scanner with a hosted service interface is provided. Specifically, a scanner provides a connection to an external device in response to a connection request and a received instruction that is obtained over the connection (independent of a second connection between the scanner and a Point-Of-Sale (POS) terminal that processes POS transactions) is processed on the scanner.

DETAILED DESCRIPTION

Figure 1:
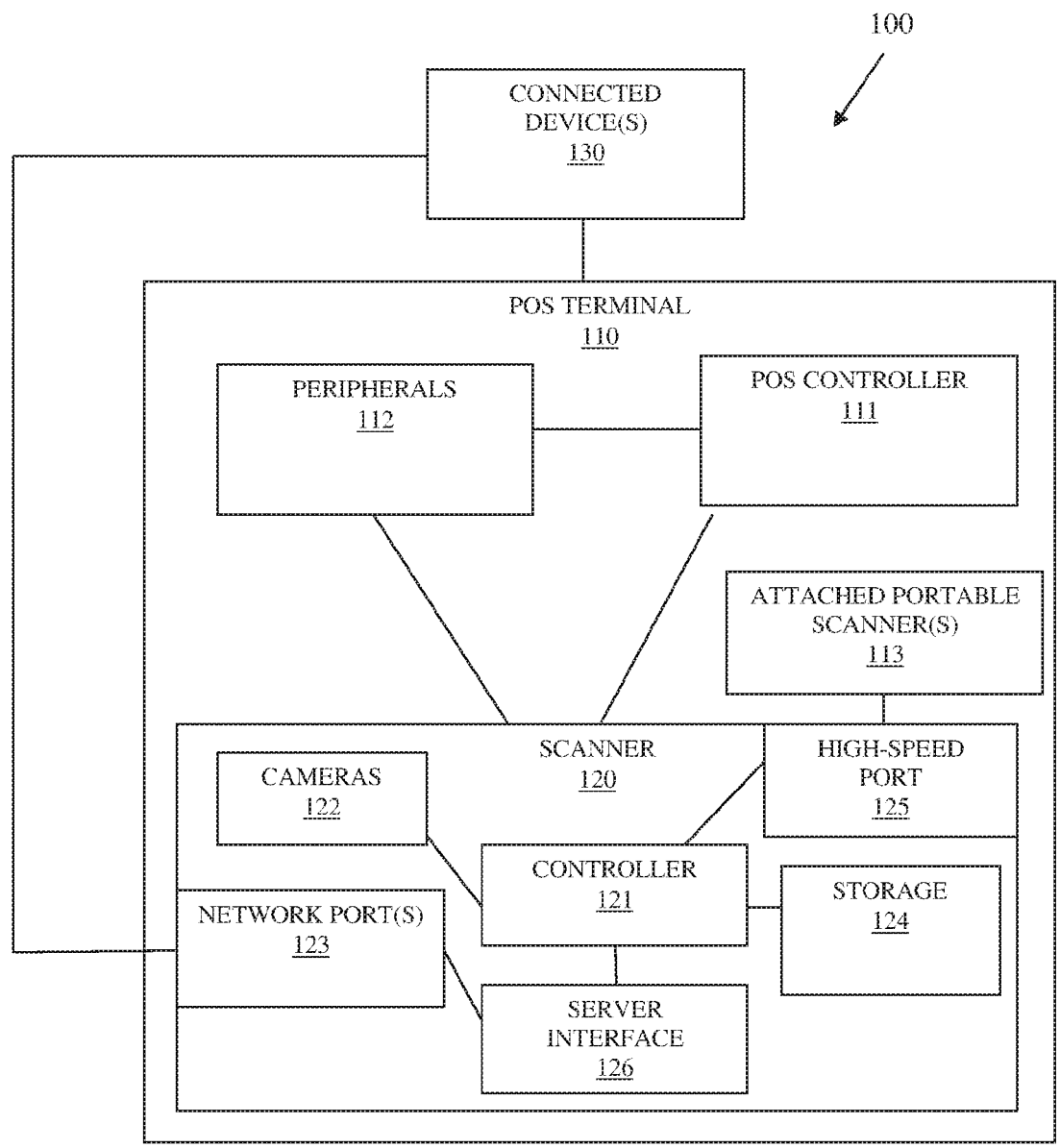
FIG. 1 is a diagram illustrating components of a retail checkout system that includes a Point-Of-Sale (POS) terminal having an integrated scanner and the scanner providing a hosted server interface independent of the scanner's connection to the POS terminal, according to an example embodiment.

FIG. 1 is a diagram illustrating components of a retail checkout system 100 that includes a Point-Of-Sale (POS) terminal having an integrated scanner and the scanner providing a hosted server interface independent of the scanner's connection to the POS terminal, according to an example embodiment. It is to be noted that the system 100 is shown schematically in greatly simplified form, with only those components relevant to understanding of this embodiment being illustrated. The same situation may be true for the other various components of the POS terminal 110 (POS terminal 110 may also be referred to herein as a checkout station 110).

Furthermore, the various components (that are identified in the FIG. 1) are illustrated and the arrangement of the components is presented for purposes of illustration only. It is to be noted that other arrangements with more or less components are possible without departing from the teachings of an independent integrated network scanner with a server hosting interface, as presented herein and below.

Moreover, the methods for scanner operation and the scanner presented herein and below may include all or some combination of the components shown in the retail system 100. The methods are programmed as executable instructions in memory and/or non-transitory computer-readable storage media and executed on one or more processors associated with the components/devices.

Specifically, the retail system 100 is configured to operate a novel scanner 120 independent of the POS terminal 110 to which the scanner 120 is integrated as a peripheral device for providing a hosted sever interface from the scanner 120.

The retail system includes a POS terminal 110, an integrated scanner 120, at least one connected or connectable device 130 (connected device 130). The POS terminal 110 also includes a POS controller 111 and a variety of other integrated peripheral devices 112 (such as but not limited to: a keyboard, a display, a touch screen, a card reader, a weigh scale, and others). The scanner 120 includes: a scanner controller 121, a plurality of cameras 122, one or more network communication ports 123 (which are independent of the scanner's connection to the POS terminal 110, optionally, storage 124, at least one attached portable scanner 113 connected to a high-speed port 125, and a server interface 126.

In an embodiment, the scanner 120 includes an integrated weigh scale or an internal port for connecting to a weigh scale.

The scanner controller 121 is one or more software modules that execute on one or more processors of the scanner or a control/mother board (having memory and one or more processors) associated with the scanner 120, and the control/mother board having electronic componentry to drive the mechanical components of the scanner 120 as directed by the scanner controller 121 and to receive and communicate data instructions and/or data from and to the scanner controller 121.

The scanner controller 121 is interfaced to the cameras 122, the network port 123, the storage 124, and, optionally, the high-speed port 125 (through data bus connections) to one or more attached portable or remote handheld scanners 113.

In an embodiment the scanner controller 121 is a new controller installed and configured on the scanner 120 for interacting with the server interface 126 as discussed herein and below. The new controller 121 performs communications and operations directed by the server interface 126 independent of a separate existing scanner controller assisting in processing POS transactions being processed on the POS terminal 110. The new controller 121 cooperates with the existing controller to manage conflicts occurring with any of the cameras 122 during concurrent server interface 126 communication processing. In an embodiment, the scanner 120 includes a multiprocessor architecture having multiple processors such that new controller 121 and the existing controller process in parallel.

In an embodiment, the scanner controller 121 is an enhanced version of an existing controller installed and configured on the scanner 120 for processing interactions received from the server interface 126 as discussed herein and below and for assisting in POS transactions being processed by the POS terminal 110.

In an embodiment, the scanner 120 includes 4 cameras 122.

In an embodiment, the scanner 120 includes less than 4 cameras 122.

The network port 123 provides an independent network connection between the scanner 120 and one or more connected devices 130. The devices 130 are external to the POS terminal 110 and accessible over a wired, wireless, or combination of wired and wireless network connections. The connections can be Peer-To-Peer (P2P) connections where the server interface 126 is directly connected to a specific connected device 130 in a P2P network session or the connections can be between the server interface 126 and multiple connected devices 130 (more than one device) over a Local-Area Network (LAN) and/or Wide-Area Network (WAN) supported by the server interface 130. The independent network connection(s) is independent of and separate from the connection that the scanner 120 has with the POS terminal 110 for assisting in processing POS transactions.

In an embodiment, the network port 123 is an Ethernet port.

In an embodiment, the network port 123 is a wireless port. In an embodiment, the wireless port supports Bluetooth® connections. In an embodiment, the wireless port supports a WiFi connection. In an embodiment, the wireless port supports a Bluetooth® Low Energy (BLE) connection.

In an embodiment, the scanner 120 includes at least one Ethernet network port 123 and at least one wireless network port 123.

In an embodiment, the server interface 126 presents through the network port 123 an ONVIF-enabled protocol interface for receiving video-related configuration instructions and commands and for sending to the connected devices 130 responses. The ONVIF-enabled protocol interface permits the scanner 120 to present as a device for interaction with over a network as part of the Internet-of-Things (IoTs). This permits the scanner 120 to be operated independent from the network and independent of scanner-related processing occurring within the POS terminal 110 for POS transaction processing.

In an embodiment, the server interface 126 presents a web-based Hypertext Markup Language (HTML) or HTML over a Secure Socket Layer (SSL and referred to as HTTPS) interface over connections made to the server interface 126 through the network ports 123. In an embodiment, the server interface 126 is a series of HTML web pages hosted from the storage 124 that permits interaction with and configuration of the scanner 120 through communication between a back-end Application Programming Interface (API) of the server interface 126 to the scanner controller 121. Of course, it is noted that the HTML interface could also be (in an embodiment) an Extensible Markup Language (XML) hosted format.

In an embodiment, the server interface 126 presents a wired Ethernet-based interface over connections the network ports 123.

A front-end interface portion of the interface 126 is presented over the network ports 123 (such as a web site with the web pages obtained through the storage 124) and information provided in the front-end interface portion is translated (through the API) into commands recognized and processed by the controller 121 for purposes of: 1) configuring the scanner 120; 2) performing video capture through the cameras 122, and/or 3) performing new operations on the scanner, which are not currently supported by conventional scanners (as discussed herein and below). The commands directed over the front-end interface of the server interface 126 are translated for operation on the scanner 120 by the controller 121 and are independent of and separate from the scanner's connection to the POS terminal 110. In situations of conflicts that may occur through some command processing by the controller 121 between the directives of the front-end interface portion and POS transaction processing, the controller 121 can buffer in storage 124 conflicts and use a priority policy to determine command precedence processing (cache memory on the scanner 120 may also be used in connection with conflict processing in cooperation with the storage 124).

In an embodiment, the front-end interface portion includes an API for which an automated program processing on the connected device can use for interacting with the server interface 126 independent of a human operator of the connected device 130. So, the front-end interface portion can both support interaction with a human operator or automated interaction with an automated program/application over the network port 123.

In an embodiment, the front-end interface portion of the interface provides fields and/or options for the connected device 130 to configure an attached portable or remote scanner 113.

In an embodiment, the front-end interface portion of the interface provides an option to obtain the configuration settings of the scanner 120 and/or the configuration settings of any attached portable or remote scanner 113. In an embodiment, when the option is selected by an operator of a connected device 130, the configuration settings are provided in a file in storage 124 for downloading by the connected device 130. In an embodiment, when the option is selected by an operator of a connected device, the configuration settings are provided in an encoded two-dimensional (2D) barcoded image. In an embodiment, when the option is selected by an operator of a connected device, the configuration settings are provided in an encoded Quick Response (QR) code.

In an embodiment, the controller 121 is configured to recognize a specific type of scanner barcode or QR code that temporarily puts the scanner 120 into a predefined or known network configuration mode that directs the server interface 126 to activate for connection to a connected device 130 over the network port 123 for scanner configuration. In this embodiment, the server interface 126 may broadcast a WiFi or Bluetooth® identifier (such as a Service Set Identifier (SSID)) when the controller identifies the specific barcode or QR as having been scanned through one of the cameras 122); such that a connection to the server interface 126 can be made through the connected device 130. In an embodiment, this special barcode or QR code may additionally place the scanner 120 into a configuration mode for receiving configuration settings from the connected device 130.

In an embodiment, the controller 121 is configured to recognize a specific type of scanner barcode or QR code previously generated by an instance of the server interface associated with a different scanner. The controller 121 can read the code as instructions for configuring the scanner 120 and/or an attached portable or remote scanner 113 and configure the scanner and/or portable scanner 113 in response to processing the instructions embedded in the barcode or QR code.

In an embodiment, portions of the server interface 126 may be updated, replaced, deleted, or added to the server interface 126 over the network port 123 during a connection to a connected device 130. Such portions can be replaced or written to the storage 124 during the connection. Moreover, if necessary, the server interface 126 may force a boot of the scanner 120 following the changes and/or instruct the controller 121 following the changes and on further direction of the server interface 126 to kill or terminate the server interface 126 and then immediately restart the server interface 126 without booting the scanner 120.

In an embodiment, the front-end interface portion of the server interface 126 provides options for selection during a connection to a connected device 130 for viewing the scanner's configuration parameters, such as barcode symbology, communication protocol's supported on the scanner 120, the scanner's Internet Protocol (IP) address, the scanner's Media Access Code (MAC), the scanner's File Transfer Protocol (FTP) address, and any other Ethernet-based data available from the scanner 120.

In an embodiment, the front-end interface portion of the server interface 126 permits metrics related to historical operation of the scanner 120 to be obtained from the storage 124, such as total scanned items, last fault, last update, software resource identifiers and version information, and the like.

In an embodiment, the front-end interface portion of the scanner interface 126 permits the connected device (through an automated program or a human operator) to define a custom metric to capture and retain in a log retained in the storage 124. This custom metric is then translated into commands understood by the controller 121 and captured on the scanner 120 in the storage 124 for subsequent analysis. In an embodiment, the custom metric is entirely handled by the interface 126 when relevant to operations of the interface 126 independent of the controller 121.

In an embodiment, the front-end interface portion of the server interface 126 permits custom reports of the metrics to be periodically transmitted by the server interface 126 to a designated remote network resource identifier (such as an email address, a remote storage location, and the like). In an embodiment, the front-end interface portion of the server interface 126 permits reports of metrics or state of the scanner 120 to be sent to a designated remote network resource identifier upon detection of a custom-defined event detected on the scanner by either the controller 121 and/or the server interface 126.

In an embodiment, the front-end interface portion of the server interface 126 permits transmission and installation of a firmware upgrade to the scanner 120 (again through cooperation between the back-end interface portion of the server interface 126 and the controller 121 utilizing the on-scanner storage 124.

In an embodiment, the front-end interface portion of the server interface 126 permits calibration of an integrated weigh scale of the scanner 120.

In an embodiment, the front-end interface portion of the server interface 126 permits viewing through the front-end interface live images of diagnostic and status information for interactively debugging the scanner 120 remotely.

In an embodiment, the front-end interface portion permits ONVIF communication for performing live or recorded video capabilities through a connection with a connected device 130 in cooperation with the storage 124.

In an embodiment, the front-end interface portion of the server interface 126 permits a remote file separate from the connection with the connected device 130 to be designated for retrieval by the server interface over a different network port 123, wherein the remote file includes configuration settings that the server interface 126 retrieves and interacts with the controller 121 to install and activate on the scanner 120.

In an embodiment, the server interface 126 cooperates over a LAN or WAN connection through the network port 123 with other instances of the server interface 126 processing on other connected scanners. In an embodiment, the server interface 126 acts as master server in the connection to clone configuration settings of the scanner 120 on one or more of the other connected scanners through cooperation with the other server interfaces of those other scanners. In an embodiment, the server interface 126 acts as a slave server to one of the other scanners for purposes of cloning the scanner with configuration settings communicated by an instance of the server interface on the other scanner.

In an embodiment, the network port 123 is a logical port that provides an independent network connection between the server interface 126 and a connected device 130 from a different logical port associated with a different network connection between the controller 121 and the POS terminal 110. In an embodiment, the logical port 123 supports multiple different connections to multiple different connected devices 130 simultaneously while the controller 121 is connected to the POS terminal 120.

These and other embodiments are now discussed with reference to the FIGS. 2-4.

Figure 2:
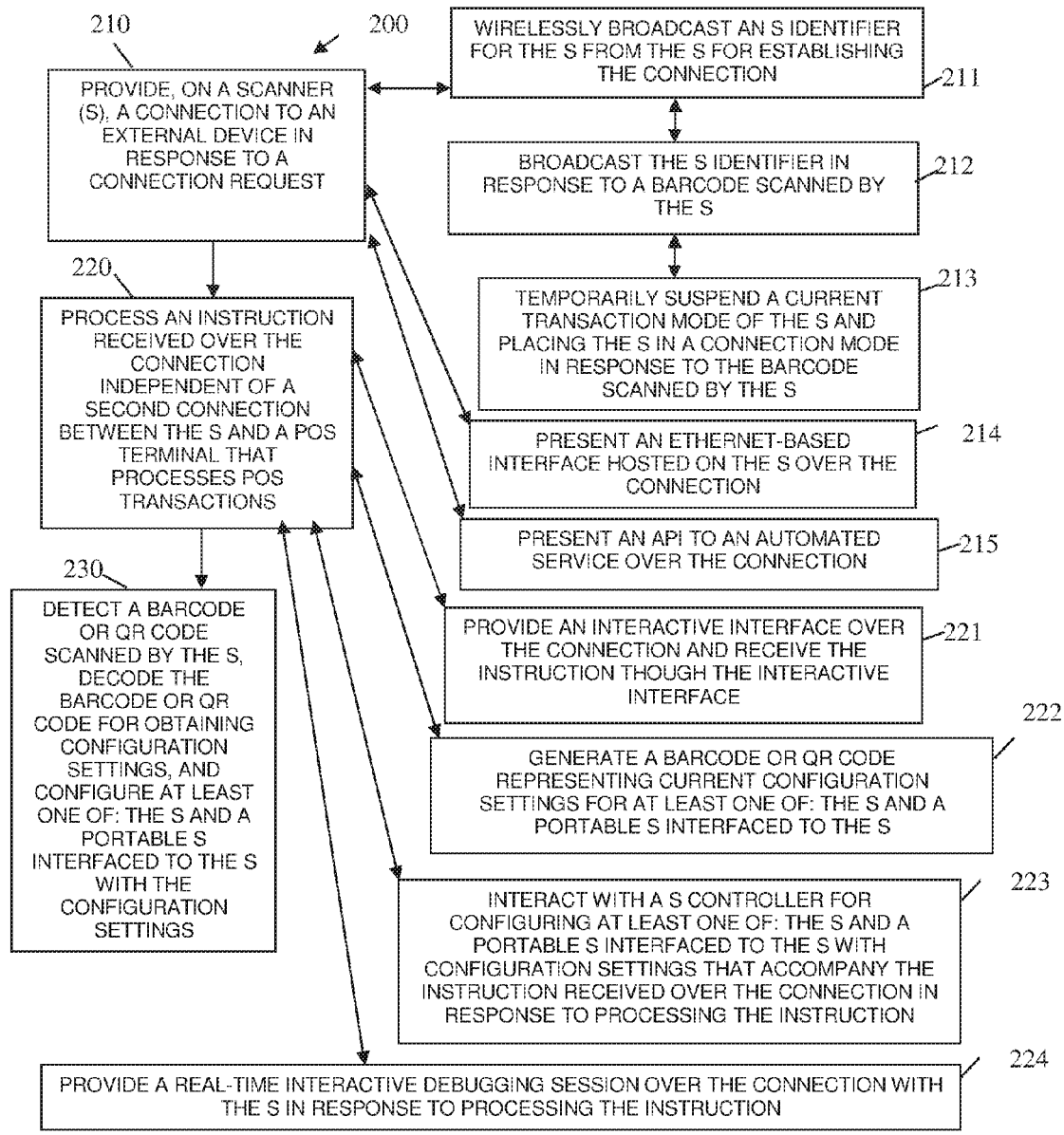
FIG. 2 is a diagram of a method for operating a scanner with a hosted server interface, according to an example embodiment.

FIG. 2 is a diagram of a method 200 for operating a scanner with a hosted server interface, according to an example embodiment. The software module(s) that implements the method 200 is referred to as a "scanner-hosted server interface." The scanner-hosted server interface is implemented as executable instructions programmed and residing within memory and/or a non-transitory computer-readable (processor-readable) storage medium and executed by one or more processors of a POS scanner. The processor(s) of the scanner that executes the scanner-hosted server interface are specifically configured and programmed to process the scanner-hosted server interface. The scanner-hosted server interface has access to multiple networks during its processing.

In an embodiment, the scanner is the scanner 120 of the FIG. 1.

In an embodiment, the scanner-hosted server interface is the server interface 126 of the FIG. 1.

In an embodiment, the POS terminal 110 having the scanner 120 and the scanner-hosted server interface as server interface 126 is one of: a kiosk, a Self-Service Terminal (SST), an Automated Teller Machine (ATM), and a cashier-assisted Terminal.

In an embodiment, the scanner-hosted server interface cooperates with one or more other instances of the scanner-hosted server interface executing on other scanners to form a cloud-based server environment having hosted actions and processing through a cloud, in the manners discussed herein above and below (the cloud being the cooperating instances of the scanner-hosted server interface provided from the scanners).

At 210, scanner-hosted server interface process on and from the scanner that executes the scanner-hosted server interface a connection to an external device in response to receiving a connection request for the external device.

According to an embodiment, at 211, the scanner-hosted server interface wirelessly broadcasts a scanner identifier for the scanner from the scanner for establishing the connection and receiving the connection request.

In an embodiment of 211 and at 212, the scanner-hosted server interface broadcasts the scanner identifier in response to a barcode scanned by the scanner.

In an embodiment of 212 and at 213, the scanner-hosted server interface temporarily suspends a current transaction mode of the scanner and places the scanner in a connection mode in response to the barcode scanned by the scanner.

In an embodiment, at 214, the scanner-hosted server interface presents a web-based interface or an Ethernet-based hosted on the scanner over the connection.

In an embodiment, at 215, the scanner-hosted server interface presents an API to an automated service over the connection.

At 220, the scanner-hosted server interface processes an instruction received over the connection independent of a second connection between the scanner and a POS terminal that processes POS transactions.

In an embodiment, any of the above instructions (selected options in the server interface 126 discussed in the FIG. 1) are capable of being processed by the scanner-hosted server interface in 220.

According to an embodiment, at 221, the scanner-hosted server interface provides an interactive interface over the connection and receive the instruction through the interactive interface.

In an embodiment, at 222, the scanner-hosted server interface generates a barcode or QR code representing current configuration settings for at least one of: the scanner and a portable or remote scanner interfaced to the scanner.

In an embodiment, at 223, the scanner-hosted server interface interacts with a scanner controller (such as scanner controller 123) for configuring at least one of: the scanner and a portable or remote scanner interfaced to the scanner. The configuration settings accompany the received instruction over the connection and are configured in response to processing the instruction.

In an embodiment, at 224, the scanner-hosted server interface provides a real-time interactive debugging session over the connection with the scanner in response to processing the instruction.

According to an embodiment, at 230, the scanner-hosted server interface detects a barcode or a QR code scanned by the scanner. The scanner-hosted server interface decodes the barcode or the QR code for obtaining configuration settings. Then, the scanner-hosted server interface configures at least one of: the scanner and a portable or remote scanner interfaced to the scanner with the configuration settings. The configuration settings encoded in the barcode or QR code are produced by a different instance of the scanner-hosted server interface that executes on a different scanner. This permits the different scanner to be cloned as the scanner having the scanner-hosted server interface.

Figure 3:
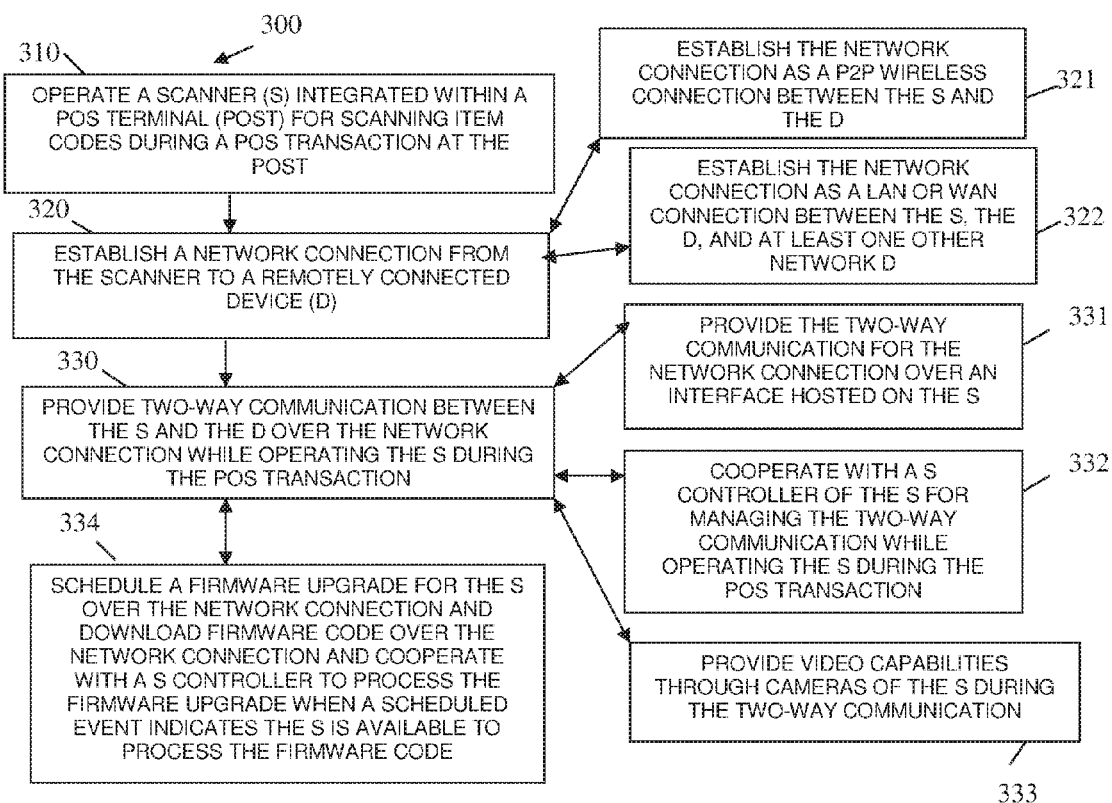
FIG. 3 is a diagram of another method for operating a scanner with a hosted server interface, according to an example embodiment.

FIG. 3 is a diagram of another method 300 for operating a scanner with a hosted server interface, according to an example embodiment. The software module(s) that implements the method 300 is referred to as a "remote scanner interface." The remote scanner interface is implemented as executable instructions programmed and residing within memory and/or a non-transitory computer-readable (processor-readable) storage medium and executed by one or more processors of a scanner. The processors that execute the remote scanner interface are specifically configured and programmed to process the remote scanner interface. The remote scanner interface has access to multiple networks during its processing.

The remote scanner interface presents another and perhaps enhanced perspective of the method 200.

In an embodiment, the remote scanner interface is the server interface 126.

In an embodiment, the remote scanner interface is the method 200.

In an embodiment, the remote scanner interface is all or some combination of the method 200 and the server interface 126.

In an embodiment, the scanner that executes the remote scanner interface is the scanner 120.

In an embodiment, the remote scanner interface cooperates with one or more other instances of the remote scanner interface executing on other scanners to form a cloud-based server environment having hosted actions and processing through a cloud, in the manners discussed herein above and below (the cloud being the cooperating instances of the remote scanner interfaces provided from the scanners).

In an embodiment, the POS terminal 110 that includes the scanner 120 and the remote scanner interface as the server interface 126 is one of: a kiosk, a SST, an ATM, and a cashier-assisted terminal.

At 310, the remote scanner interface operates a scanner integrated within a POS terminal for scanning item codes during a POS transaction at the POS terminal.

At 320, the remote scanner interface establishes a network connection from the scanner to a remotely connected device (such as a tablet, a desktop computer, a laptop computer, a server, a wearable processing device, a phone, and an intelligent appliance having processor and memory capabilities).

According to an embodiment, at 321, the remote scanner interface establishes the network connection as a P2P wireless connection between the scanner and the remotely connected device.

In an embodiment, at 322, the remote scanner interface establishes the network connection as a LAN or a WAN connection between the scanner, the remotely connected device, and at least one other network device.

At 330, the remote scanner interface provides two-way communication between the scanner and the remotely connected device over the network connection while operating the scanner during the POS transaction.

In an embodiment, at 331, the remote scanner interface provides the two-way communication for the network connection over an interface hosted on or from the scanner.

In an embodiment, at 332, the remote scanner interface cooperates with a scanner controller of the scanner for managing two-way communication while operating the scanner during the POS transaction.

In an embodiment, at 333, the remote scanner interface provides video capabilities through cameras of the scanner during the two-way communication.

According to an embodiment, at 340, the remote scanner interface schedules a firmware upgrade for the scanner over the network connection and downloads firmware code over the network connection. Moreover, the remote scanner interface cooperates with a scanner controller to process the firmware upgrade when a scheduled event indicates that the scanner is available to process the firmware code.

Figure 4:
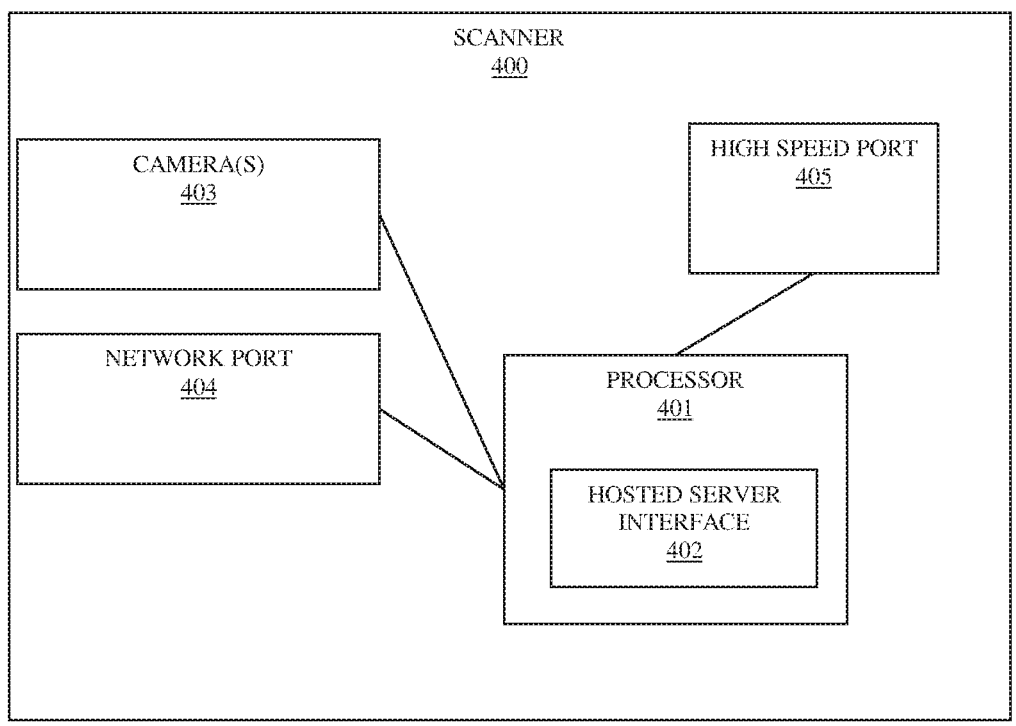
FIG. 4 is a diagram of scanner, according to an example embodiment.

FIG. 4 is a diagram of scanner 400, according to an example embodiment. Some components of the scanner 400 are programmed and reside within memory and/or a non-transitory computer-readable medium and execute on one or more processors of the scanner 400. The scanner 400 communicates over multiple networks.

In an embodiment, the scanner 400 is the scanner 120 of the FIG. 1.

In an embodiment, the scanner is integrated or interfaced to the POS terminal 110 of the FIG. 1. In an embodiment, the POS terminal 110 is one of: a kiosk, a SST, an ATM, and a cashier-assisted terminal.

The scanner 400 includes a processor 401, a hosted server interface 402, one or more cameras 403, at least one external network port 404, and, optionally, a high-speed port 405.

The remote interface 402 is configured to: execute on the processor 401, activate the at least one camera 403 in response to a Point-Of-Sale (POS) terminal to scan an item during a POS transaction, wherein the scanner is connected to the POS terminal through a first network port, provide the hosted server interface 402 to at least one connected device over the at least one external network port 404, and (iv) process at least one instruction on the scanner 400 received from at least one connected device over the at least one external network port 404.

In an embodiment, the hosted server interface 402 is the server interface 126.

In an embodiment, the hosted server interface 402 is the method 200.

In an embodiment, the hosted interface 402 is the method 300.

In an embodiment, the hosted server interface 402 is all or some combination of the server interface 126, the method 200, and/or the method 300.

In an embodiment, the hosted interface 402 cooperates with other executing instances of the hosted interface that execute on other scanners to provide a cloud processing environment as a single network-facing cloud.

In an embodiment, the scanner 400 includes at least two external network ports 404. In an embodiment, one of the two external network ports 404 is a wired Ethernet Port and the other of the two external network ports 404 is a wireless port (WiFi or Bluetooth®). In an embodiment, the scanner 400 includes at least three external network ports 404: one wired Ethernet, one WiFi, and one Bluetooth®. In an embodiment, the scanner 400 includes a single external network port 404 as a logical external port 404 that supports multiple types of simultaneous and disparate network connection types.

In an embodiment, the scanner 400 includes a connected portable scanner connected to the scanner 400 over a high-speed port 405.

In an embodiment, the one or more cameras 403 are five or more cameras, four integrated into the scanner 400 and one or more remotely located cameras from the scanner 400 and the POS terminal, and the remotely located cameras connected to the scanner 400 over the high-speed port 405 (with or without a network hub).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing, on a scanner, a first connection by the scanner to an external device in response to a connection request, wherein providing further comprises wirelessly broadcasting a scanner identifier for the scanner from the scanner for establishing the first connection, and wherein wirelessly broadcasting further includes broadcasting the scanner identifier in response to a barcode scanned by the scanner, and wherein wirelessly broadcasting further includes temporarily suspending a current transaction mode of the scanner and placing the scanner in a connection mode in response to the barcode scanned by the scanner; and
processing an instruction associated with a scanner function obtained over the first connection independent of a second connection between the scanner and a Point-Of-Sale (POS) terminal that processes POS transactions.

2. The method of claim 1, wherein providing further includes presenting an Ethernet-based interface hosted on the scanner over the first connection.

3. The method of claim 1, wherein providing further includes presenting an Application Programming Interface (API) to an automated service over the first connection.

4. The method of claim 1, wherein processing further includes providing an interactive interface over the first connection and receiving the instruction though the interactive interface.

5. The method of claim 1, wherein processing further includes generating a second barcode or Quick Response (QR) code representing current configuration settings for at least one of: the scanner and a portable scanner interfaced to the scanner.

6. A method, comprising:
providing, on a scanner, a first connection by the scanner to an external device in response to a connection request; and
processing an instruction associated with a scanner function obtained over the first connection independent of a second connection between the scanner and a Point-Of-Sale (POS) terminal that processes POS transactions, wherein processing further includes interacting with a scanner controller for configuring at least one of: the scanner and a portable scanner interfaced to the scanner with configuration settings that accompany the instruction received over the first connection in response to processing the instruction.

7. A method, comprising:
providing, on a scanner, a first connection by the scanner to an external device in response to a connection request; and
processing an instruction associated with a scanner function obtained over the first connection independent of a second connection between the scanner and a Point-Of-Sale (POS) terminal that processes POS transactions, wherein processing further includes providing a real-time interactive debugging session over the first connection with the scanner in response to processing the instruction.

8. The method of claim 7 further comprising, detecting a barcode or Quick Response (QR) code scanned by the scanner, decoding the barcode or QR code for obtaining configuration settings, and configuring at least one of: the scanner and a portable scanner interfaced to the scanner with the configuration settings.

9. A method, comprising:
providing, on a scanner, a connection to an external device in response to a barcode scanned by the scanner, including temporarily suspending a current transaction mode of the scanner and placing the scanner in a connection mode and wirelessly broadcasting a scanner identifier for the scanner from the scanner for establishing the connection; and
processing an instruction obtained over the connection independent of a second connection between the scanner and a Point-Of-Sale (POS) terminal that processes POS transactions.

10. A method, comprising:
providing, on a scanner, a connection to an external device in response to a connection request; and
processing an instruction obtained over the connection independent of a second connection between the scanner and a Point-Of-Sale (POS) terminal that processes POS transactions, including interacting with a scanner controller for configuring at least one of: the scanner and a portable scanner interfaced to the scanner with configuration settings that accompany the instruction received over the connection in response to processing the instruction.

11. A method, comprising:
providing, on a scanner, a connection to an external device in response to a connection request; and
processing an instruction obtained over the connection independent of a second connection between the scanner and a Point-Of-Sale (POS) terminal that processes POS transactions, including providing a real-time interactive debugging session over the connection with the scanner in response to processing the instruction.

* * * * *